May 22, 1962   J. H. FEASTER   3,035,553
ROTARY ENGINE
Filed April 10, 1961   3 Sheets-Sheet 1
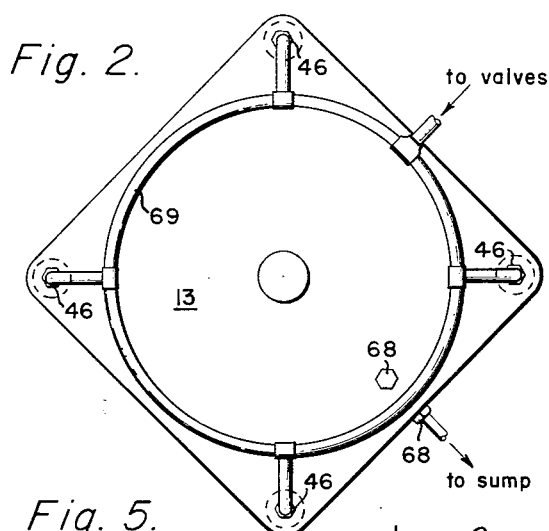
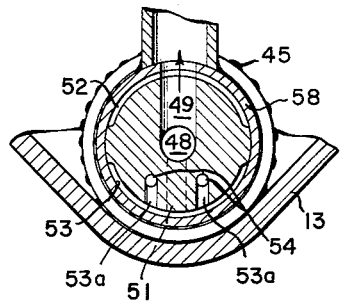
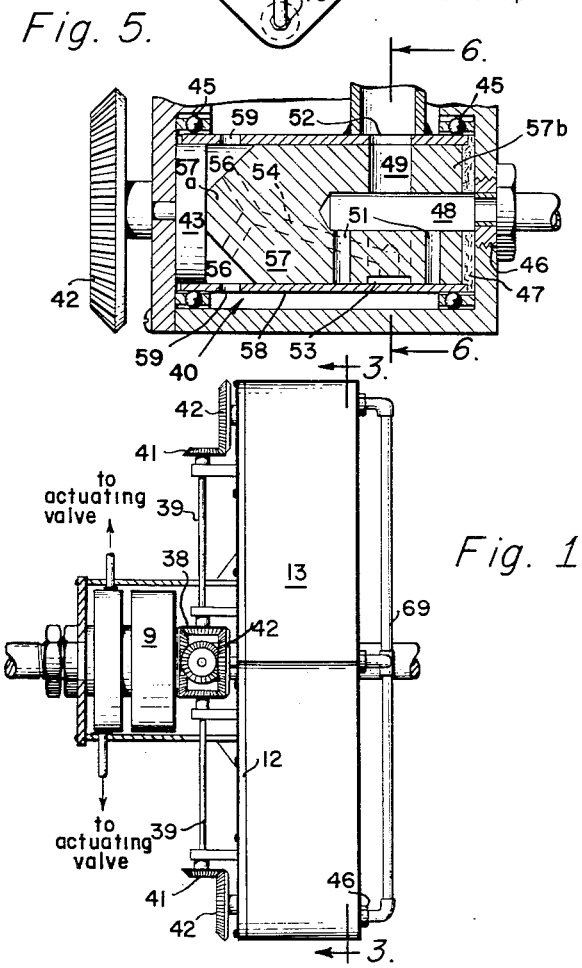
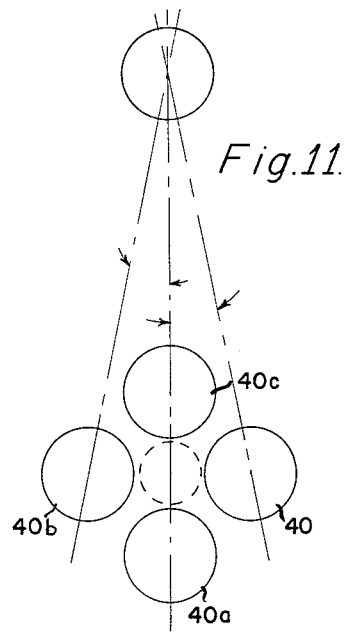
INVENTOR.
John H. Feaster May 22, 1962  J. H. FEASTER  3,035,553
ROTARY ENGINE
Filed April 10, 1961  3 Sheets-Sheet 2
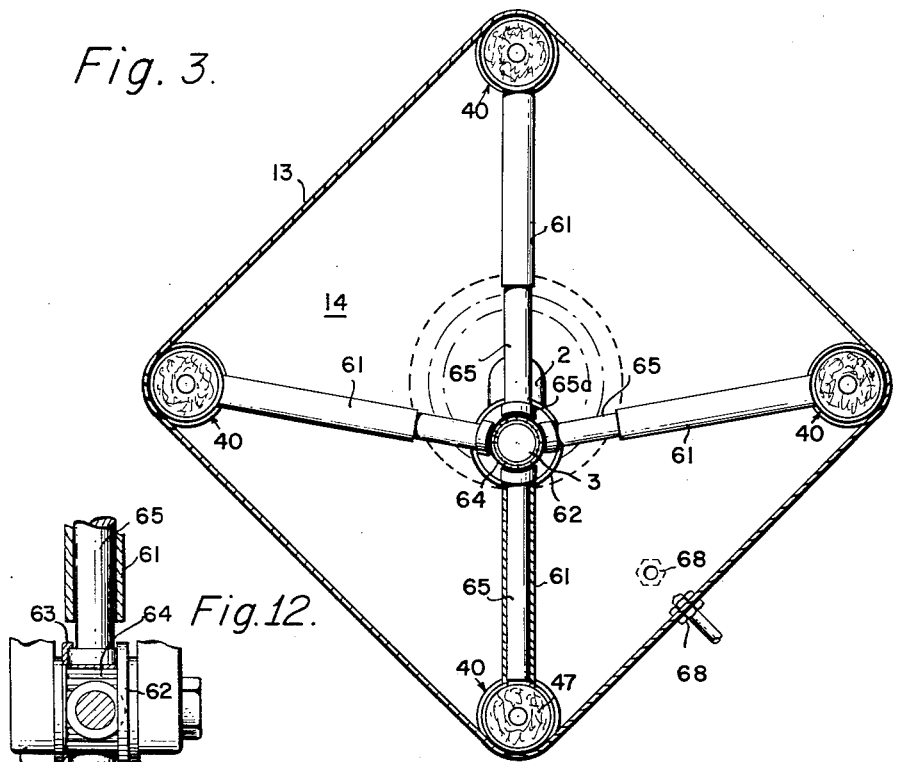
Fig. 3.
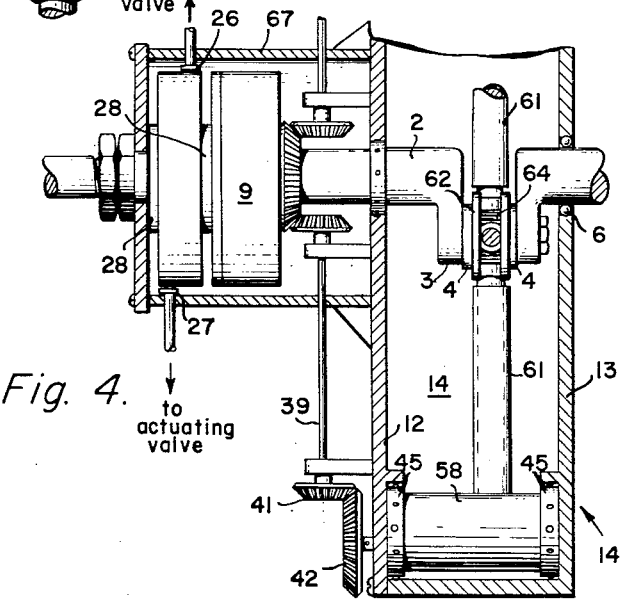
Fig.12.
Fig. 4.
John H. Feaster
INVENTOR.

May 22, 1962  J. H. FEASTER  3,035,553
ROTARY ENGINE

Filed April 10, 1961  3 Sheets-Sheet 3

John H. Feaster

INVENTOR.

United States Patent Office 3,035,553
Patented May 22, 1962

3,035,553
ROTARY ENGINE
John H. Feaster, 703 Eastwood Ave., Orange, Calif.
Filed Apr. 10, 1961, Ser. No. 101,727
5 Claims. (Cl. 121—63)

This invention relates to fluid pressure motors and more particularly to those having radially arranged cylinders around a common shaft.

One object of the invention is to provide a new and improved construction and arrangement for the transmission of power whereby a fluid under pressure is controlled by multiple valves operating in synchronism with multiple single action pistons and cylinders which are arranged radially around a common shaft.

Another object of this invention is to provide a high pressure fluid motor means for direct actuation of the driving wheels of a mobile vehicle, such as a tractor.

Still another object of this invention is to provide a multiple rotary valve structure to control the flow of pressure to and from a multiplicity of single acting cylinders connected to a common crankshaft, each rotary valve structure being fed from a common source.

Yet another object of this invention is to provide a new and improved reversing mechanism for a radial cylinder motor.

Another object is to provide a new and improved method of holding a multiplicity of piston rods in close alignment to a common crankshaft.

Figure 8:
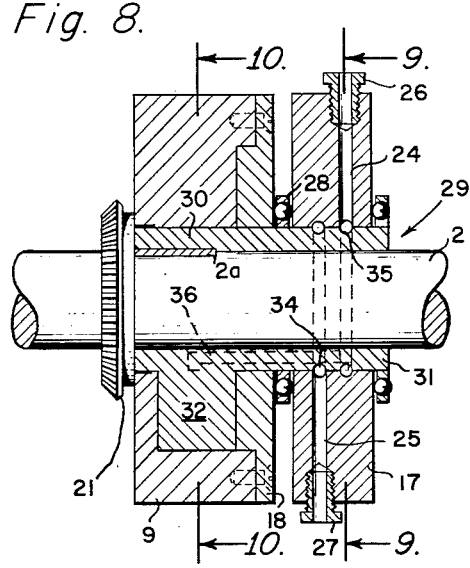
Figure 10:
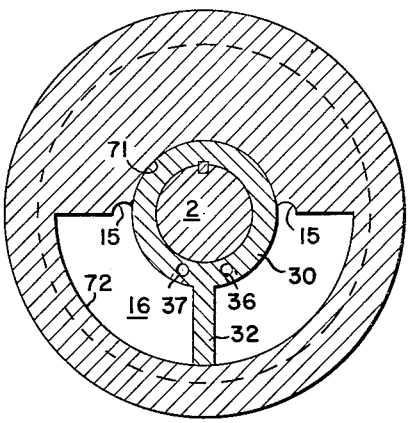
Figure 9:
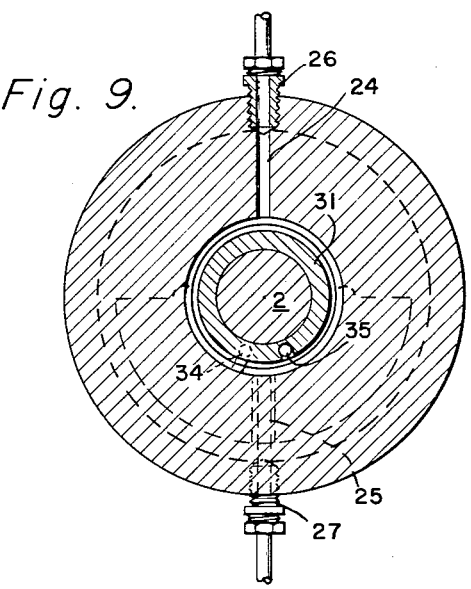
Figure 7:
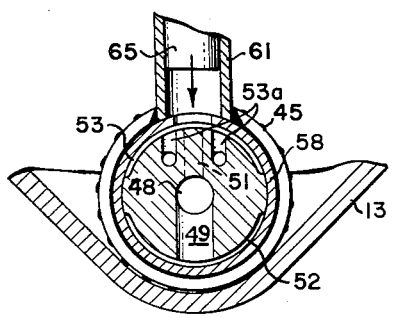

These and other objects are attained by the invention which will be understood from the following description and the accompanying drawings in which:

FIG. 1 is a side elevation of the invention;
FIG. 2 is a plan view of the invention showing the valve fluid source of supply;
FIG. 3 is a plan view of the invention with the housing cover removed showing the arrangement of the cylinders;
FIG. 4 is an elevation view of the invention in partial cross section;
FIG. 5 is an elevation in cross section of the rotary valve;
FIG. 6 is a sectional view of the rotary valve in the forward position taken on line 6—6 of FIG. 5;
FIG. 7 is a sectional view of the rotary valve in the reverse position;
FIG. 8 is an elevational view in cross section of the reversing mechanism;
FIG. 9 is a sectional view taken on lines 9—9 of FIG. 8;
FIG. 10 is a sectional view taken on lines 10—10 of FIG. 8 showing actuating projection;
FIG. 11 is a diagrammatic view of the operation of the multiple cylinders around the crankshaft; and
FIG. 12 is an elevational view of the rod retaining arrangement.

The radial motor, as shown, is provided with four single acting cylinders, although it will be understood that three or more may be used. The cylinders 61 are arranged radially around the drive shaft 2, a single crank 3 being provided on this shaft, to which the ends of four piston rods 65, riding on a bearing 64, are rotatably connected by a pair of collars 62 mounted on the crank 3 as shown in FIG. 12, and held in place by a shoulder portion 4 on the crank 3, the outer ends of the piston rods 65 having an enlarged portion 65a to cooperate with the retaining lip 63 of the collar 62. The outer end of cylinders 61 is attached to a valve member 40 as shown in FIG. 5.

The valve member 40 consists of a sleeve 58, a body 57 having a truncated end 57a, and a ported end 57b, a thrust bearing 43 and a packing ring 47 to prevent fluid leakage. An endless tubular conduit 69 having a plurality of connections 46 which are threaded to a cover 13 and cooperate with an inlet port 48, feeds the valves 40 from a common source or sump.

Turning now to FIG. 5, the valve body 57 is provided with a centrally located longitudinal axial valve inlet port 48 extending from the ported end 57b to slightly beyond the center of the body 57, a vertical hole 49 is provided to cooperate with the valve inlet port 48 and a forward groove 52, the forward groove 52 being formed on the body 57 somewhat less than half of its periphery, two vertical pressure relief holes 51 positioned diametrically opposite and equally spaced from the axis of the vertical hole 49, are provided to permit easy turning of the valve 40. A reverse groove 53 is provided on the lower half of the body 57, two evacuating holes 53a are provided to cooperate with the reversing groove 53, a pair of co-operating longitudinal passages 54 are provided to empty the fluid into the area 56 formed by the truncated end of the body 57 and the sleeve 58.

Holes 59 are provided in the sleeve 58 to return the fluid into the case 14 formed by the cover 13 and a base plate 12 and from there returned to the sump by an egress connection 68. A miter gear 42 is connected to the truncated end 57a of the body 57 and lastly a bearing 45 is placed on each end of the sleeve 58 to insure smooth operation.

As shown in FIG. 6, the fluid, under pressure, enters the valve inlet port 48 up through the vertical hole 49 and on into the cylinder 61 forcing the piston rod 65 to move.

The reversing mechanism to direct the rotary engine is shown in detail in FIGS. 8, 9, and 10. Referring to FIG. 8, an inner sleeve 29 having a grooved end 31 and an actuating end 30, is provided with an actuating projection or vane 32, and fixedly mounted on the shaft 2 by a key 2a. A first and second groove 35 and 34 spaced apart from each other are provided on the outer diameter of the inner sleeve 29. A first and second longitudinal passage 36 and 37 are provided, the passage 36 beginning at first groove 35 and the second passage 37 beginning at the second groove 34 and both terminating at the sides of the actuating projection portion 32. A rotatable housing 9 having an inner diameter 71 to receive the actuating end 30 of the inner sleeve 29 and an increased diameter in the lower half only, at 72, to cooperate with the actuating projection or vane 32. The inner diameter 71 also having two recesses 15 to prevent restriction of flow resulting from movement of the actuating projection 32.

A bevel gear 21 is fastened to one face of the rotatable housing 9 and a cover plate 18 is secured to the other face and forms the actuating area 16. A bearing 28 is placed between rotatable housing 9 and a ported housing 17. Turning now to FIG. 10, a plan view in cross section is taken of FIG. 8, showing more clearly the actuating projection or vane 32 and the actuating area 16. Ported housing 17 is provided, with a central hole to receive the grooved end 31 of the inner sleeve 29. The inner diameter of the central hole is grooved about the inner wall and spaced to form the other half of the grooves 34 and 35. A forward vertical hole 24 is provided with a fitting 26 for emitting the fluid through the ported housing 17 into the first groove 35 communicating with the first passage 36 and discharging into area 16. Diametrically opposite the forward vertical hole 24 is a reverse, vertical hole 25 with a fitting 27 in the ported housing 17 to provide a return flow through the second passage 37 and the reverse, vertical hole 25 when the rotatable housing 9 is forced to rotate by the fluid under pressure.

Returning again to FIG. 1 for a more complete description of the operation of the radial motor, after the valve cylinders 40 have been synchronized or timed to operate in a particular pattern or sequence the fluid is forced into the ported housing 17 through the forward vertical hole 24 and the first groove 35 into area 16 causing the rotatable housing 9 to move 180 degrees counter clockwise as viewed in FIG. 10 carrying the bevel gear 21 therewith. This movement causes each miter gear 38 having an identical gear 41 attached to the other end of a shaft 39 to advance accordingly the gear 41 cooperating with the valve gear 42 as shown in the diagrammatic sketch in FIG. 11 brings the valve 40 into the forward or advance position, that is in position to permit the entrance of fluid through the inlet port 48 and the vertical hole 49 giving the piston rod an inward thrust turning the crankshaft 2 a quarter of a revolution, during this time the valve 40a is in the discharge position and its piston rod is being pushed downward emptying the fluid therefrom through the evacuating holes 53a into the peripheral groove 53 on into the passages 54 into the area 56 through the holes 59 in the inner sleeve 58 into the case 14 from there back to the sump through the fitting 68 at which time the valve 40a being in position to receive fluid, turns the crankshaft 2 a quarter turn at which time the valve 40b takes over and lastly the valve 40c completing a revolution of the crankshaft 2. Fluid pressure applied in area 16 keeps the rotatable housing 9 in constant movement with the crankshaft 2 and the bevel gear 21 being fixedly mounted to the rotatable housing 9 keeps the gear train and the cylinder valves in this sequence during forward operation.

When an actuating valve is operated to reverse position, the fluid is emptied from area 16 through the first passage 36 and emitted through the passage 37 causing the housing 9 and the bevel gear 21 to reverse direction 180 degrees clockwise at which time the valve 40c, as shown in the diagrammatic sketch in FIG. 11, takes over and the same sequence is affected in reverse.

The advantages of the motor will be apparent.

The valve structure is extremely simple, self-sealing and self-balancing. It is intended that the fluid pressures used in this system shall be very high so that great force may be applied to the crankshaft through the cylinders.

What is claimed is:

1. A fluid pressure engine comprising a frame, a plurality of radially disposed power cylinders, a hydraulic cylinder valve connected to each said cylinder for porting fluid to and from said cylinder, a reciprocating piston in each said cylinder controlled by said fluid, a crankshaft journalled on said frame and having a crank, means connecting each said piston to the crank of said crankshaft, tubular conduit means arranged to feed said hydraulic cylinder valves, a directional means mounted on said crankshaft and having a housing rotatable between two positions relative to said crankshaft, and means controlled by said housing and connected to said hydraulic cylinder valves for controlling said hydraulic cylinder valves in a particular position.

2. A fluid pressure engine comprising a frame, multiple radially disposed power cylinders, hydraulic cylinder valves connected to each said cylinder, a reciprocating piston in each said cylinder, a crankshaft journalled on said frame and having a crank, means for connecting each piston to the crank of said crankshaft, tubular conduit means arranged to feed said hydraulic valves, an inner actuating sleeve fixedly mounted on said crankshaft, said inner sleeve having an actuating vane and said inner sleeve having two passages and two peripheral grooves, a directional flow housing having a centrally located longitudinal hole and rotatably mounted on said inner actuating sleeve said directional flow housing having two grooves on the diameter of said longitudinal hole, an actuating housing having a centrally located longitudinal hole and an increased diameter on the lower half thereof and means connected between said actuating housing and said hydraulic cylinder valves for controlling said hydraulic cylinder valves.

3. A fluid pressure engine comprising a frame, a plurality of radially disposed power cylinders, a hydraulic cylinder valve connected to each said cylinder, a reciprocating piston having an enlarged portion on the end thereof, a crankshaft having a pair of shoulders, a bearing rotatably mounted on said crank between said pair of shoulders, said enlarged portion having a concave surface to cooperate with said bearing, a pair of flanged collars mounted on said crank and cooperating with said enlarged portion, tubular conduit means arranged to feed said hydraulic cylinder valves, a directional means mounted on said crankshaft and having a housing rotatable between two positions and means controlled by said housing and connected to said hydraulic cylinder valves for controlling said hydraulic cylinder valves in a particular position.

4. A fluid pressure engine comprising a frame, a plurality of radially disposed power cylinders, a hydraulic cylinder valve connected to each said cylinder, said hydraulic cylinder valve comprising a sleeve fixedly mounted on the end of said power cylinder, a truncated body portion having a thrust bearing end and a packing ring end and rotatably mounted in said sleeve, a first and second peripheral groove on the same axis each slightly less than one half the circumference of said truncated body portion, said peripheral grooves to cooperate with said power cylinder, an inlet port entering said truncated body portion from said packing ring end and extending longitudinally slightly beyond the center, a vertical passage cooperating with said inlet port, said power cylinder and said first peripheral groove, a pair of pressure relief passages extending from said inlet port to the wall of said sleeve, a pair of reversing passages, a pair of longitudinal discharging passages cooperating with said reversing passages and said peripheral groove, a plurality of discharge holes about the periphery of said sleeve adjacent the thrust bearing end of said truncated body, rotatable means mounted to the thrust bearing end of said truncated body cooperating with said housing and connected to said hydraulic cylinder valves for controlling said hydraulic cylinder valves.

5. A fluid pressure engine comprising a frame, a plurality of radially disposed power cylinders, a hydraulic cylinder valve connected to each said cylinder, a reciprocating piston in each said cylinder, a crankshaft journalled on said frame and having a crank, means connecting each said piston to the crank of said crankshaft, tubular conduit means to feed said hydraulic cylinder valves, a directional means mounted on said crankshaft, said directional means mounted on said crankshaft, said directional means having a rotatable housing, a ported housing and inner sleeve, said inner sleeve having a pair of peripheral grooves on one end and a vane, perpendicular to the longitudinal axis of said inner sleeve on the other end fixedly mounted on said shaft a ported housing having a central, a first and second groove about the periphery of said central hole spaced to cooperate with the grooved end of said inner sleeve, a vertical forward passage in said ported housing cooperates with said first peripheral groove, a vertical reverse passage diametrically opposite said forward passage and spaced to cooperate with said peripheral second groove, a forward longitudinal passage beginning at said first peripheral groove, a reverse longitudinal passage beginning at said second peripheral groove each terminating on one side and the other of said perpendicular vane, a rotatable housing mounted on said inner sleeve and having an increased diameter portion to cooperate with said perpendicular vane on said inner sleeve, said increased diameter portion being provided with a recess adjacent to the outer diameter of said inner sleeve, a cover plate fixedly mounted to the face of said rotatable housing enclosing said perpendicular vane, a bevel gear fixedly mounted to the other face of said rotatable housing and a gear drive driven by said bevel gear and connected to and driving said hydraulic cylinder valve gears.

No references cited.